United States Patent [19]
Meares et al.

[11] Patent Number: 6,157,651
[45] Date of Patent: Dec. 5, 2000

[54] ROGUE DATA PACKET REMOVAL METHOD AND APPARATUS

[75] Inventors: George Thomas Meares; Edward Dale Danford, both of Huntsville; Bruce A. Hardy, Meridianville, all of Ala.

[73] Assignee: VMIC, Inc., Huntsville, Ala.

[21] Appl. No.: 09/063,612

[22] Filed: Apr. 21, 1998

Related U.S. Application Data

[60] Provisional application No. 60/043,970, Apr. 23, 1997.

[51] Int. Cl.[7] .............................. H04L 12/28; H04L 12/56
[52] U.S. Cl. ......................... 370/403; 370/258; 370/452; 709/251
[58] Field of Search .................................... 370/254, 255, 370/256, 257, 258, 389, 400, 401, 402, 403, 404, 405, 406, 449, 450, 451, 452, 457; 709/251

[56] References Cited

U.S. PATENT DOCUMENTS

| | | | |
|---|---|---|---|
| 4,507,777 | 3/1985 | Tucket et al. .............................. | 370/258 |
| 4,881,074 | 11/1989 | Reichbauer et al. ..................... | 370/258 |
| 5,031,174 | 7/1991 | Natsume . | |
| 5,124,984 | 6/1992 | Engel ....................................... | 370/230 |
| 5,182,747 | 1/1993 | Frenzel, III et al. .................... | 370/452 |
| 5,216,670 | 6/1993 | Ofek et al. . | |
| 5,251,213 | 10/1993 | Videlock et al. . | |
| 5,351,243 | 9/1994 | Kalkunte et al. . | |
| 5,442,632 | 8/1995 | Burton et al. . | |
| 5,450,578 | 9/1995 | Mackenthun . | |
| 5,471,461 | 11/1995 | Engdahl et al. ......................... | 370/252 |
| 5,495,589 | 2/1996 | Mackenthun et al. . | |
| 5,528,594 | 6/1996 | Butter et al. ............................ | 370/452 |
| 5,781,545 | 7/1998 | Matthew ................................. | 370/389 |

*Primary Examiner*—Ajit Patel
*Assistant Examiner*—Bob A. Phunkulh
*Attorney, Agent, or Firm*—Lanier Ford Shaver & Payne, P.C.; Frank M. Caprio, Esq.

[57] ABSTRACT

The present invention provides a method and apparatus for removing unwanted data packets from a ring topology communication network having a plurality of nodes. The invention ensures that a data packet is removed from the network if there is a failure of the originating node, or if there is a failure of the node principally responsible for removing the data packet. The invention provides fault-tolerance, without significantly adversely affecting the overall network performance. The invention provides the originating node address in a controlled field of the data packet, with unused data bits within the control field being used as "rouge packet bits." The invention will include one or more nodes designated as "rouge data packet removal nodes" or "rouge removal nodes." A data packet is created at an originating node which will embed its own address in a "Node ID" field of the data packet and will transmit the data packet along the network. The invention enables rouge data packets to be detected and removed from the network.

29 Claims, 13 Drawing Sheets

ROGUE DATA PACKET REMOVAL METHOD AND APPARATUS

CROSS REFERENCE TO RELATED PROVISIONAL APPLICATION

This application claims the benefit of Provisional Application Ser. No. 60/043,970, for "ROGUE DATA PACKET REMOVAL METHOD AND APPARATUS," filed on Apr. 23, 1997, which is fully incorporated herein by reference, and this application claims the priority of the filing date of said provisional application.

BACKGROUND OF THE INVENTION

1. Field of the Invention

The present invention relates generally to a digital processing system with a network of devices or nodes that communicate via a serial data communication ring via data packets, and more particularly, to a novel method and apparatus for removing unwanted data packets (referred to as "rogue") from the serial ring.

2. Description of the Prior Art

Sharing information between computer systems is well known in the art. The speed at which computing technology is evolving has placed increasing demands on the need to share information between computer systems. One method of sharing data between computers that has achieved widespread recognition is the use of traditional computer networking standards, such as Ethernet, or for increased speed, Fiber Distributed Data Interface ("FDDI") networks. Moreover, the ever increasing need for faster and deterministic performance has prompted the development of newer and more robust networking schemes.

Several prior art networks employ a ring topology (FIG. 1) in which data is passed from node to node around the ring until either: (a) the data has reached the intended recipient node, or (b) until it has reached all nodes on the ring. In either case, there must be some method of removing the data from the ring.

In the case of an intended destination, the address ("Node ID") of the intended recipient is included in the packet with the data. The recipient node, recognizing that the data is intended for that node, does not pass the packet to the next node on the ring, hence removing the packet from the ring.

In the case of a system in which the data is intended to reach all nodes on the ring, two prior art methods of removing the data from the ring are known to the inventors. A discussion of these two methods and their relative merits follows:

Embedded Address "Node ID" Method. The first method is to embed the address of the originating node ("Node ID") into a field within the data packet. Once the data packet has traveled completely around the ring and returns to the originating node, the originating node recognizes the packet as its own by the "Node ID" in the packet. The originating node removes the packet from the ring by simply not retransmitting the packet to the next node on the ring. In addition to facilitating the removal of data packets that have traveled completely around the network, there are several reasons why having the address of the originating node embedded in the data packet can be advantageous. For instance, the "Node ID" of the originating node might be used by the recipients to define where to store the data, or it can be used in some other way in which the application software would associate the data with the identification of the originating node. In addition, the presence of the originating "Node ID" can be very valuable in performing network diagnostics. However, one problem with the Node ID method of removing data packets is the possibility of a hardware fault causing the originating node to be unavailable to remove the data packet. For instance, if the originating node introduced a data packet onto the ring, and then immediately, through some hardware fault or data corruption, became unable to remove that data packet, the data packet would travel continuously around the data ring. This would result in the possibility of corrupting valid data and would consume network bandwidth. This packet is commonly called a "rogue data packet" or "rogue packet." Although rogue data packets rarely occur in normal operation, a removal method that accounts for rogue data packets is desirable.

Counter Method. A second data packet removal method that accounts for rogue packets is the "counter" method. In the counter method, each node is programmed with knowledge of the total number of nodes on the network, either through software, a dip-switch setting, or some other means. Then, the originating node sets a "counter field" within the data packet equal to the total number of nodes on the ring. As the data packet is received at each node, that node decrements the counter field by one and tests to see if the counter has reached zero. If the counter has reached zero, the data packet is removed. If the counter has not reached zero, then the data packet is processed normally and forwarded to the next node, until the counter does reach zero. Other variations of the counter method are possible, but the essence is that the packet is removed after having traveled through some predetermined number of nodes. The counter method is able to remove rogue data packets because it does not rely on the address of the originating node. Under normal operation, the originating node will remove its own data packets because the counter reaches zero when the data packet has traveled once completely around the serial ring. However, if the originating node fails, the counter will reach zero at the next node on the data ring, and that node will remove the data packet. Although this method accounts for rogue packets, one problem is that this method loses all the advantages of having the address of the originating node embedded within the data packet.

The ideal solution is to use a combination of the two methods described. However, the problem with including both a counter field and an originating "Node ID" in the data packet itself is the consumption of data space in the packet. The number of bits needed for the counter field and for the "Node ID" is a function of the maximum number of nodes the network can accommodate. For example, to allow a maximum of 32 nodes, 5 bits would be required in the counter field and another 5 bits for the "Node ID." To accommodate 256 nodes, a total of 16 bits would be required, 8 for the counter field, and 8 for the "Node ID."

Further, network technologies typically do not allow adding only the necessary number of additional bits to the data packet to accommodate having both a Node ID and a counter mechanism. Rather, the size of the data packet is driven by the buswidth of the circuitry used to encode and decode the data for transmission on a data path. For example, if the buswidth of the encoder/decoder was 32 bits, and the total number of bits necessary to carry all the information needed in the packet was 97, then four 32 bit words would be required to carry the information, since 3 words can carry only 96 bits. In this example, system performance would be significantly enhanced if one bit could be removed from the packet. The presence of both the counter field and the "Node ID" adds to the number of required bits and may reduce system performance more than the addition of a few bits would imply.

A second disadvantage of the counter method is that it requires a high speed circuit to subtract one from the counter field and a circuit to detect that the counter field is zero. It also requires additional storage devices and buffers to process the added bits. This additional hardware must be present on each node, and can increase the system cost.

Therefore, a need exists for an apparatus and a method for removing unwanted data packets that include both the advantages of originating node addressing as well as fault tolerance of the counter method, without adding a large number of bits to the packet, without adding significant additional cost, and without substantially adversely affecting overall system performance. The present invention teaches such an apparatus and method.

3. Prior Art Related to the Preferred Embodiment

The preferred embodiment of this invention is a data processing system that includes at least two nodes linked together in a ring topology. Each node could be an independent computer, or other device capable of reading from or writing to memory. The nodes are linked by a unidirectional data transmission path in which data is passed from node to node around the ring until all nodes have had access to the data. Within each node is a memory device, called global memory, which is coupled to the unidirectional data transmission path. When one node updates a data item stored in global memory (i.e., writes to global memory) that data and its corresponding address within the global memory is transported by the unidirectional data transmission path to all other nodes on the ring. The data is then place in the global memory of each node at the address associated with the data. By this method each node's global memory is a replica of the global memory in all of the other nodes.

Vince, European patent 0 092 895, and U.S. Pat. No. 4,562,539, titled "Data Processing System," teaches a system similar to that just described. The Vince patent describes a token passing system in which each node on the ring is given a turn to transmit its data and is also responsible for removing that data from the ring. The token passing system allows only one node, at a time, to originate data. The originating node removes all data from the ring before passing the token to the next node.

Vince does not address the possibility that the originating node might fail to remove its data from the ring. The present invention can be applied to and used with a system as described and taught by Vince.

The preferred embodiment described herein is an enhancement of a prior art system developed by the inventors that implements the unidirectional serial data transmission path with a 1.2 Giga Baud fiber optic link and a 96 bit packet that contains 32 bits of data, 23 bits of address, 8 bits of "Node ID," and other parity and control signals.

SUMMARY OF THE INVENTION

It is an object of the present invention to provide a method and apparatus for removing unwanted data packets from a ring topology communication network which minimizes additional overhead, and includes the advantages of originating node addressing.

It is a further object of the present invention to ensure that a data packet is removed from a ring topology communication network if there is a failure of the originating node, or a failure of the node principally responsible for removing the data packet.

It is a further object of the present invention to provide fault-tolerance to a ring communication network which will remove unwanted data packets without significantly adversely affecting the overall network performance.

These and other objects are achieved by the present invention by implementing a method and apparatus which includes the address of the originating node and a backup method of removing data packets. The originating node address is contained in a control field of the data packet, and currently unused data bits within the control field of the data packet are used as "rogue packet bits." The ring topology network will have one or more nodes designated as "rogue data packet removal nodes" or "rogue removal nodes."

In operation, a data packet will be created at an originating node on the ring network. The originating node will embed its own address in a "Node ID" field of the data packet. Then the originating node will transmit the data packet along the data ring.

A second node will be designated as a rogue remover node. Once the data packet has arrived at the rogue remover node, the rogue remover node will test its designated rogue bit within the data packet. Finding that its respective rogue bit has not been set, the rogue remover node processes the data packet as any other node would. The rogue remover node will also set its respective rogue bit within the control field of the data packet before transmitting the data packet to the next node on the data ring.

The data packet will continue around the data ring until it reaches the originating node. In normal operation the originating node would recognize its own node address in the "Node ID" field of the packet and remove the data packet.

However, if for any reason the originating node failed during the time the data packet traveled around the ring, then the originating node would be unavailable to remove the data packet. If that occurred, the data packet would continue along the data ring until it reached the rogue remover node. The rogue remover node would again test its corresponding rogue bit in the control field of the data packet. Finding the rogue packet bit previously set, the rogue remover node would recognize the data packet as a rogue data packet and discard it.

Multiple nodes and multiple bits in the packet may be similarly designated for rogue packet removal. Since a node designated for rogue packet removal can also be an originating node, the use of multiple rogue packet removal nodes eliminates the possibility of a single failure eliminating the primary and all secondary methods of removing packets.

The present invention will become more fully understood from the following detailed description and the accompanying drawings which are included for illustration only, and thus are not to be considered as limiting the present invention. It should be understood that the following detailed description and specific examples, while indicating preferred embodiments of the invention, are given by way of illustration only. Various changes and modifications within the spirit and scope of the invention will become apparent to those skilled in the art from a thorough reading of this specification.

DETAILED DESCRIPTION OF THE PREFERRED EMBODIMENTS

The present invention is particularly well suited as an enhancement in a reflective memory network environment. Such a prior art environment is described in the VMIC Reflective Memory Network White Paper, originally published October, 1995, and incorporated herein by reference. While the instant invention may be adapted to work with other network systems, the preferred embodiment of the invention will be described herein with reference to the VMIC Reflective Memory Network.

Figure 1:
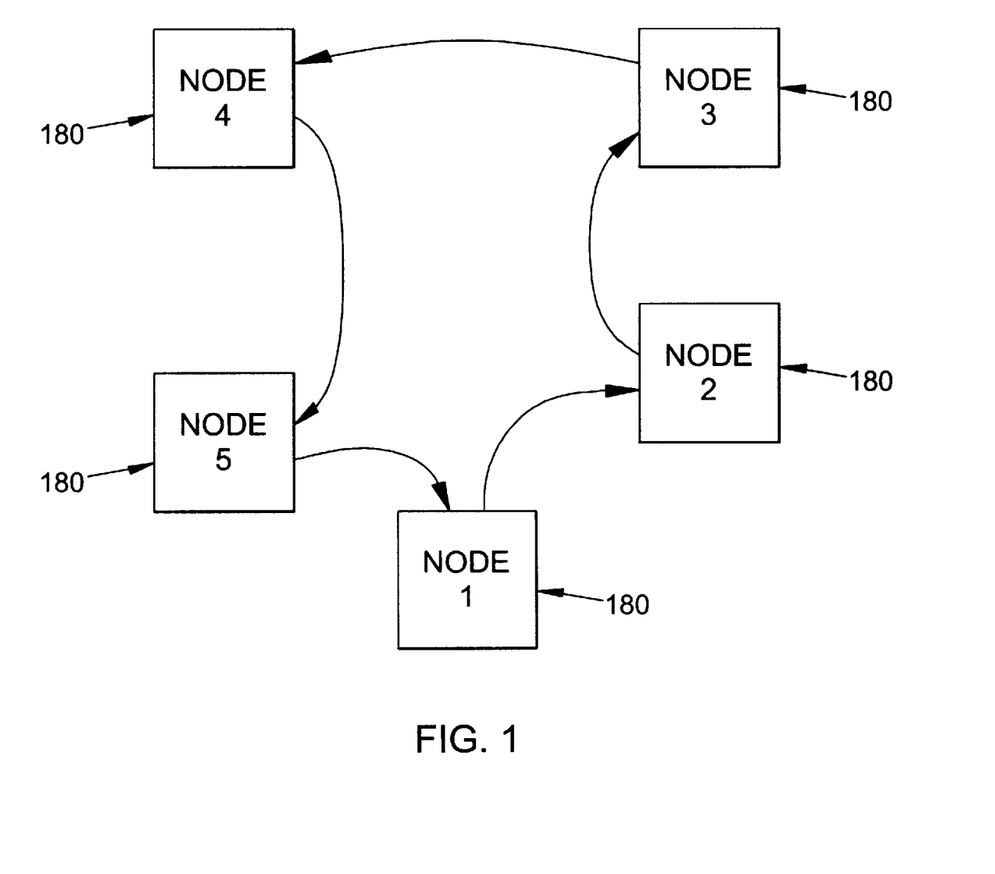
FIG. 1 is the Ring Topology Network.

FIG. 1 is a diagram of a ring topology network which indicates the nodes may communicate to each other in a circular, unidirectional, and serial fashion through a data communications medium.

Figure 2:
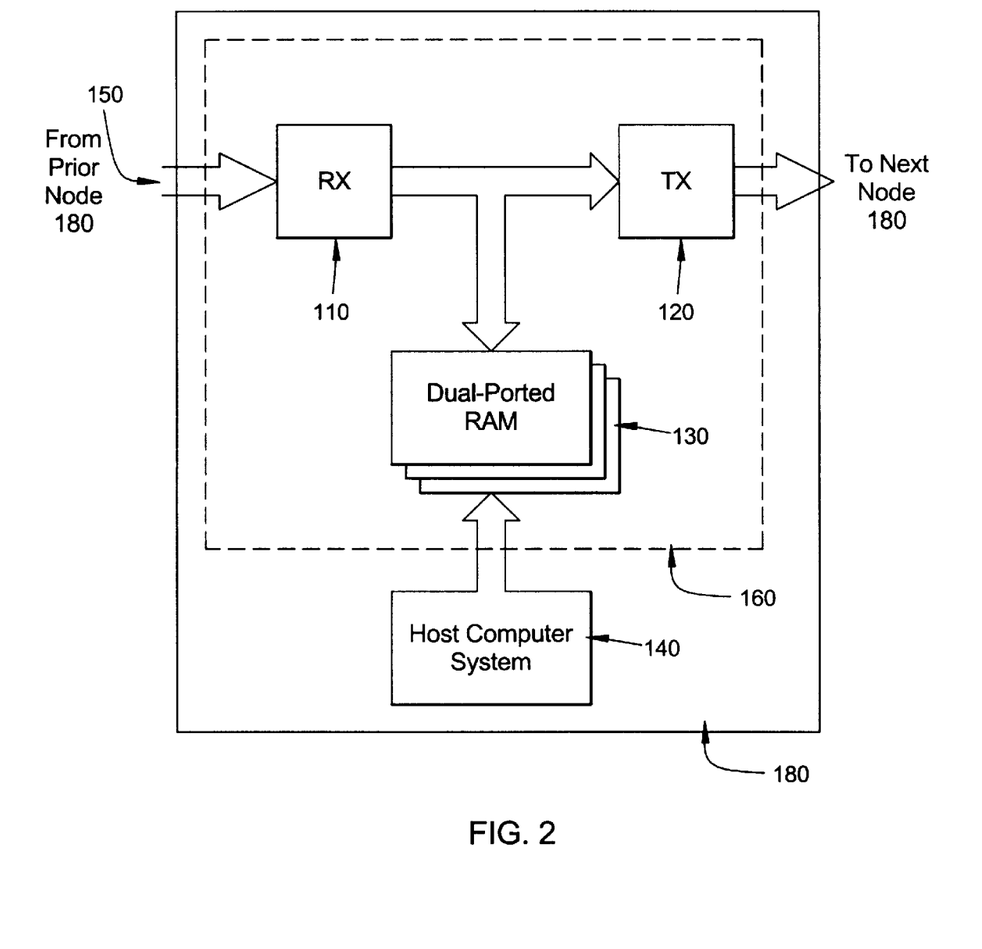
FIG. 2 is a functional overview of a single node in a sample network.

FIG. 2 is a functional block diagram of a node 180 on the serial data link or ring 150. At each node 180 of the preferred embodiment resides a reflective memory board 160. The reflective memory network is a network of nodes 180 joined together by a serial data ring 150. A host computer system 140 having a reflective memory board 160 comprises each node 180 on the serial data ring 150. Each reflective memory board 160 contains global RAM 130 disposed such that both the host and the serial data ring may gain access to the RAM and will hence be referred to in the following discussion as "dual-ported RAM." Whenever the data stored in the global RAM 130 is changed, that change is immediately broadcast to all the other nodes on the serial data ring 150. Each node then updates its own on-board global RAM 130 so that the information stored in each node's global RAM 130 is mirrored at every other node 180.

Data packets are received at each node 180 at the Receive Unit ("Rx Unit") 110, and transmitted from each node by the Transmit Unit ("Tx Unit") 120. The Rx Unit 110 simultaneously loads the data received into the global RAM 130 and the Tx Unit 120.

Figure 3:
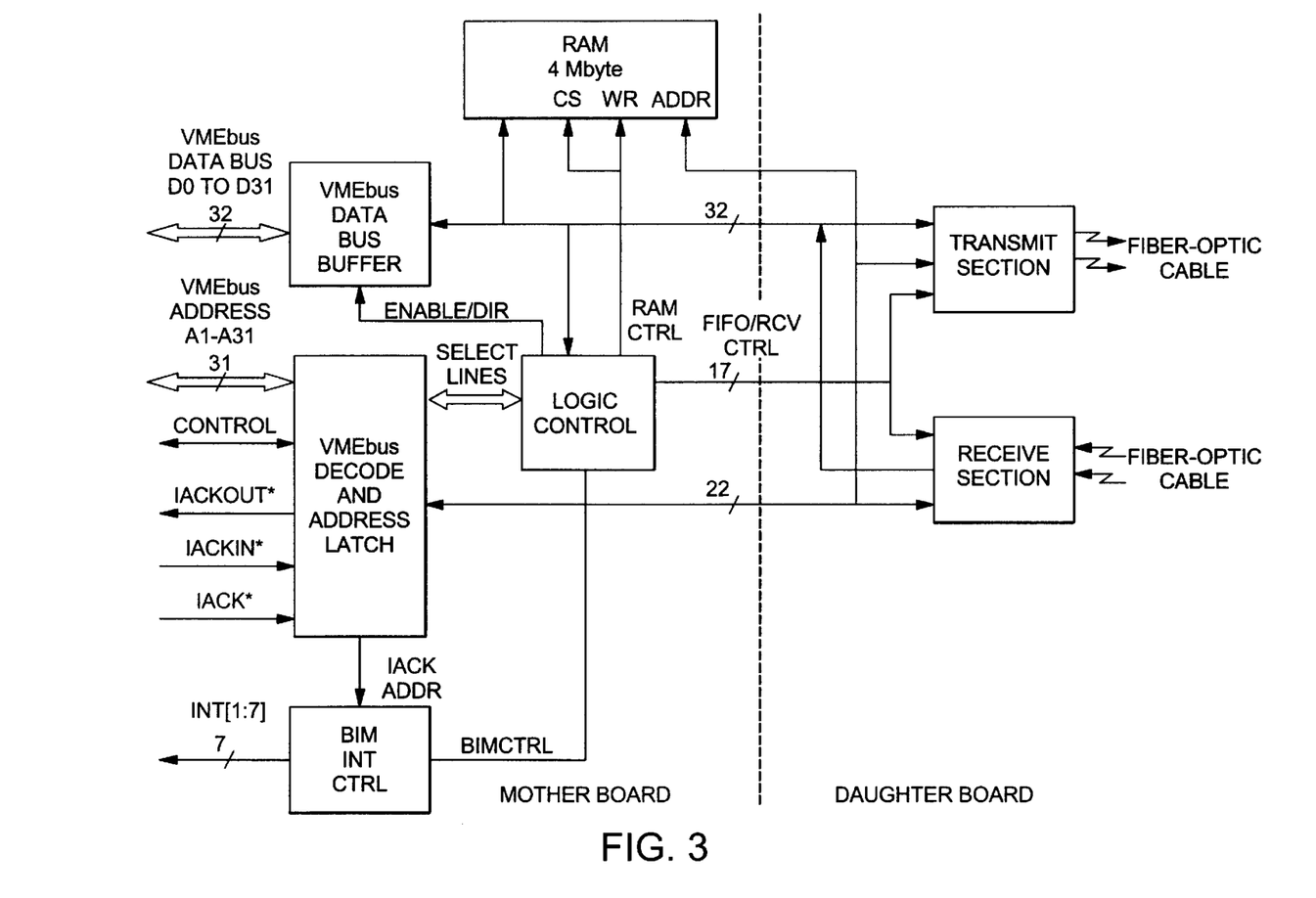
FIG. 3 is an overall block diagram of one network embodiment which is capable of employing the invention.

FIG. 3 is an overall block diagram of one network embodiment which is capable of employing the invention.

Figure 4A:
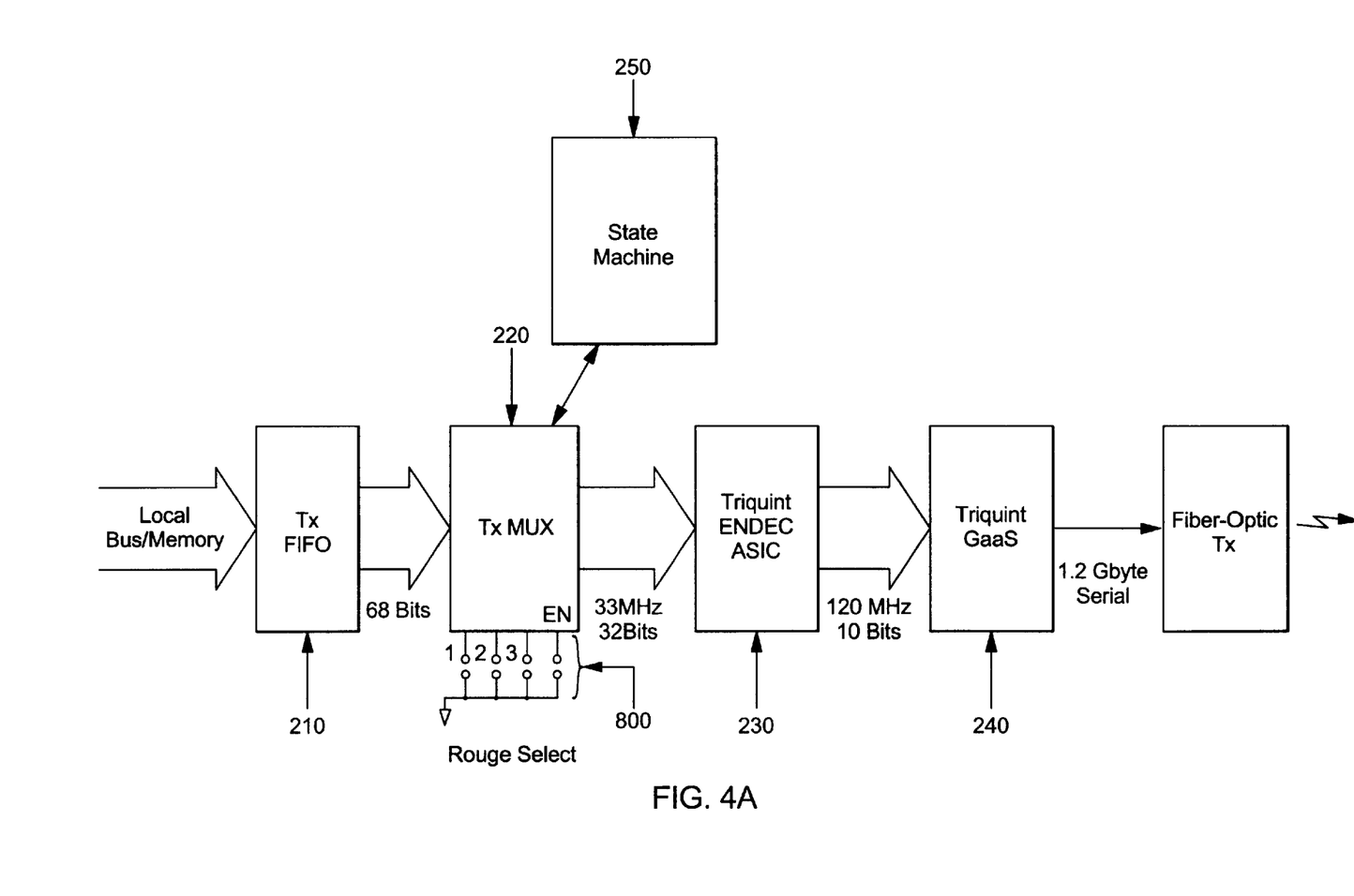
FIG. 4A is a simplified functional block diagram of the Transmit Unit ("Tx Unit") of the present invention.
Figure 7A:
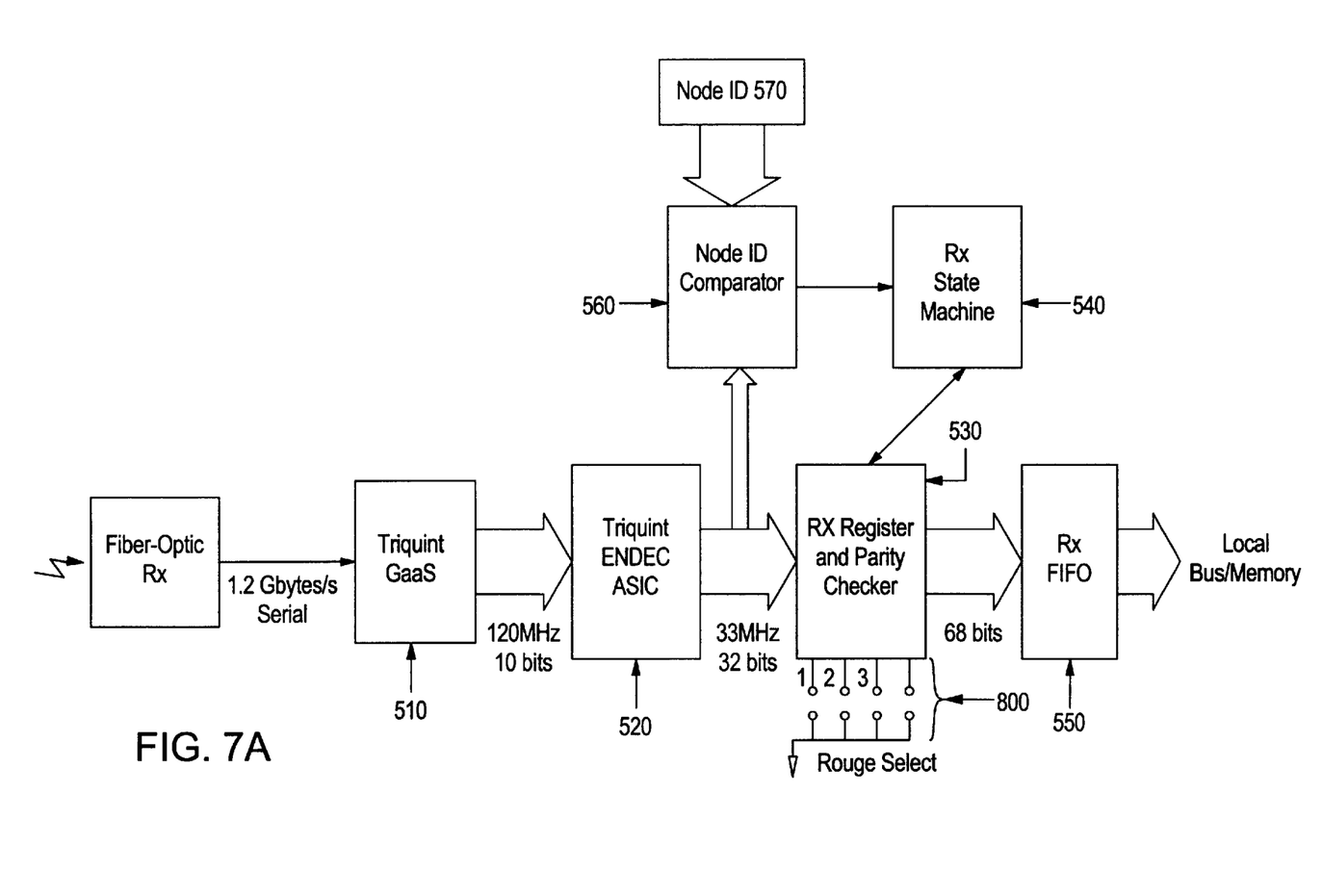
FIG. 7A is a simplified functional block diagram of the Receive Unit ("Rx Unit").
Figure 7B:
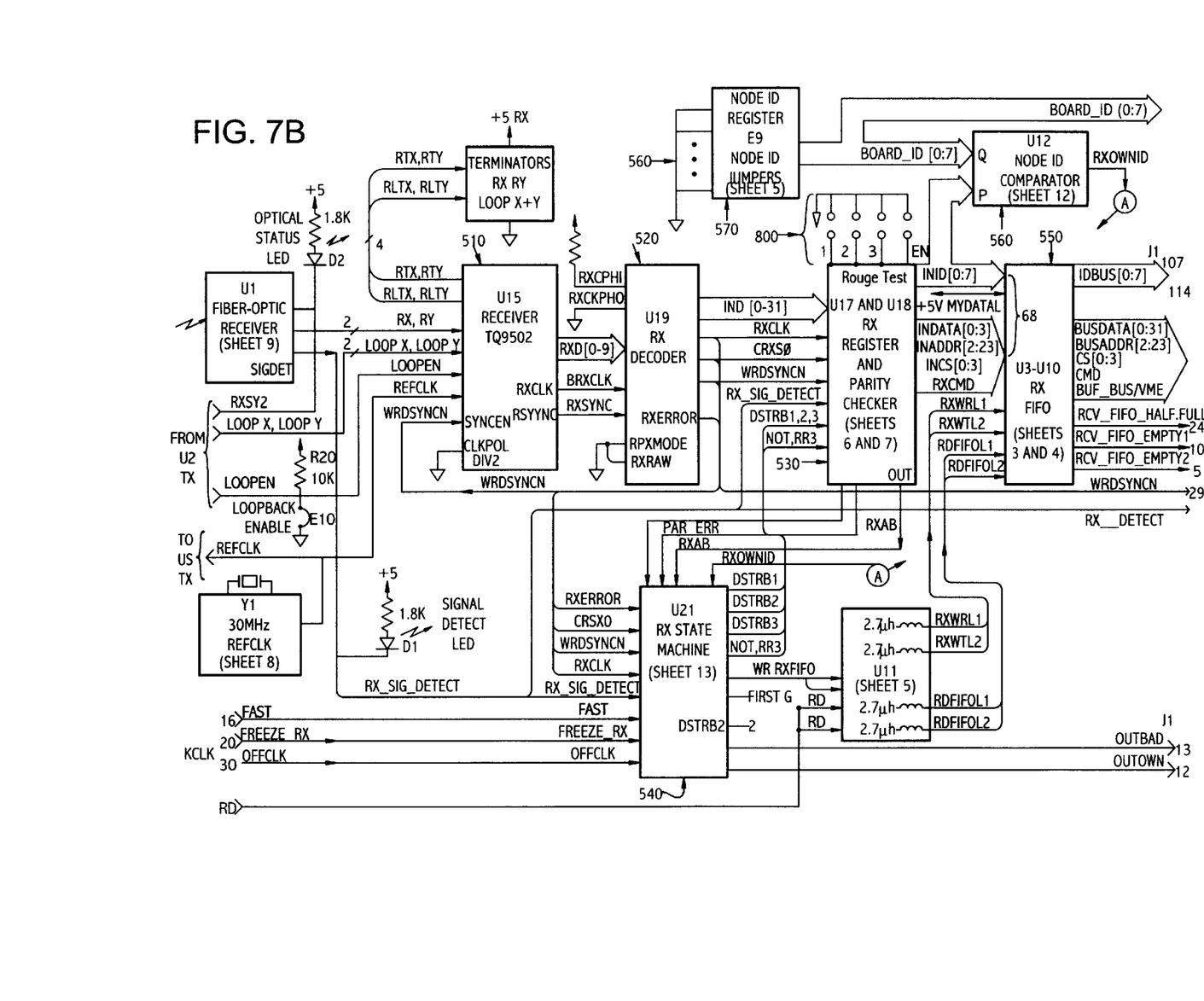
FIG. 7B shows greater detail of the Rx Unit.

FIG. 4A is a functional block diagram of the Tx Unit 120. As new data is written to the global Ram 130 from either the host computer 140 or the Rx FIFO 550, the new data is transparently loaded into the Tx FIFO 210. A data packet is formed by combining the new data with the memory address of the new data and the originating node's network address. The network address is the node's unique identifier, or Node ID. In the preferred embodiment, the Node ID is jumper configurable within the Node ID Register 570 as shown in FIGS. 7A or 7B.

Within the Tx FIFO 210, the data packet is an array of data 68 bits wide. When the data becomes available at the output of the Tx FIFO 210, the Tx State Machine 250 initiates the transfer of that data from the Tx FIFO 210 to the Tx MUX 220. It is within the Tx MUX 220 that the rogue packet bits are set if this node is a rogue packet remover. The rogue packet select is activated by installation of a jumper on the enable (EN) jumper field 800 in combination with selection of the particular rogue packet remover corresponding to the jumper position 1, 2, or 3, as has been selected and is located at jumper field 800. The operation of the Tx MUX 220 is explained in more detail below. The Tx MUX 220 outputs the data packet, complete with rogue data packet information, to the Tx Encoder 230. The Tx Encoder 230 encodes the data and outputs 10-bit parallel encoded bytes to the Tx Transmitter 240 to be transmitted along the serial data ring 150.

Figure 4B:
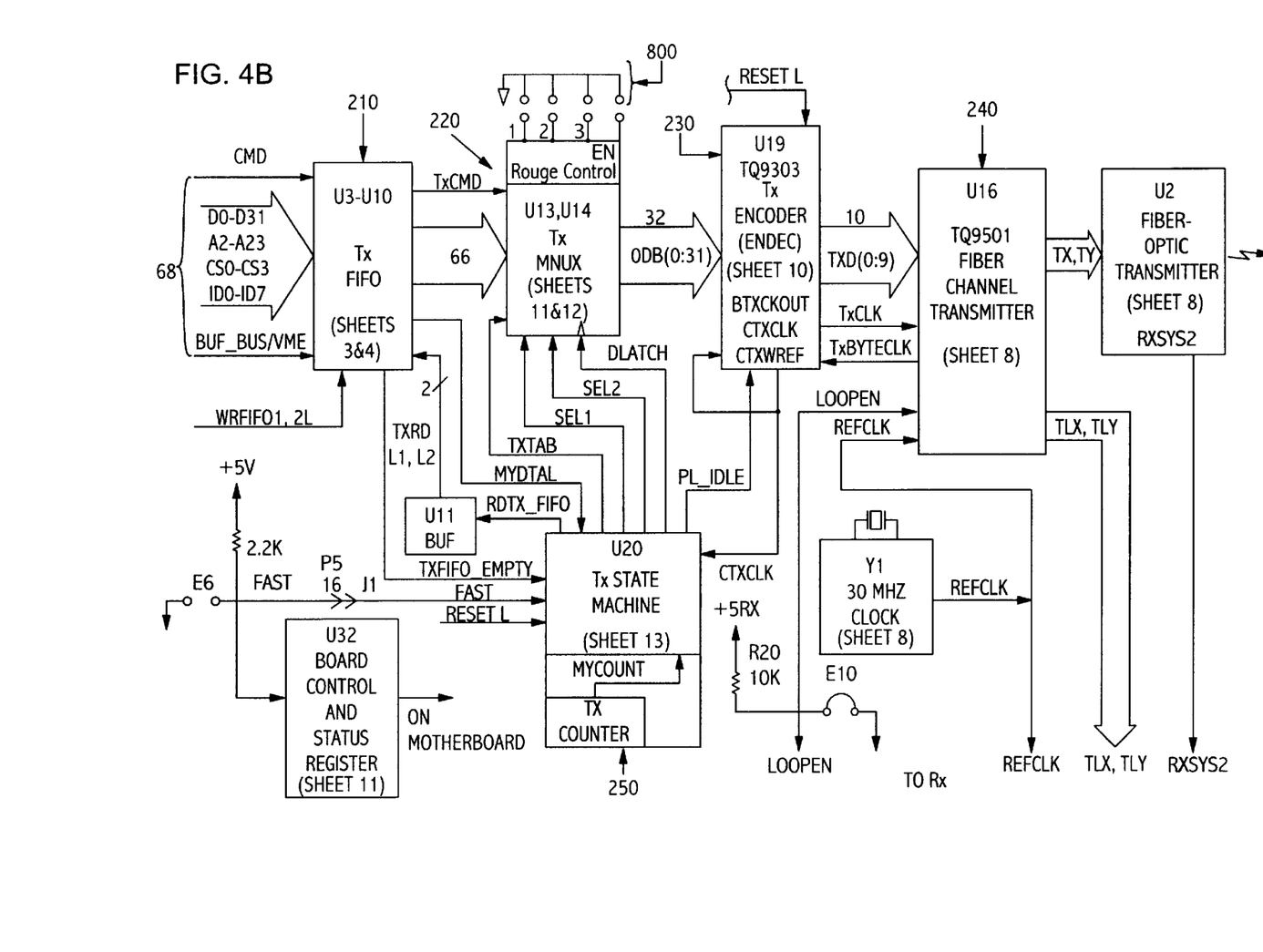
FIG. 4B shows greater detail from the Tx Unit.

FIG. 4B illustrates in greater detail the elements of the invention as shown in FIG. 4A and as described above.

Figure 5:
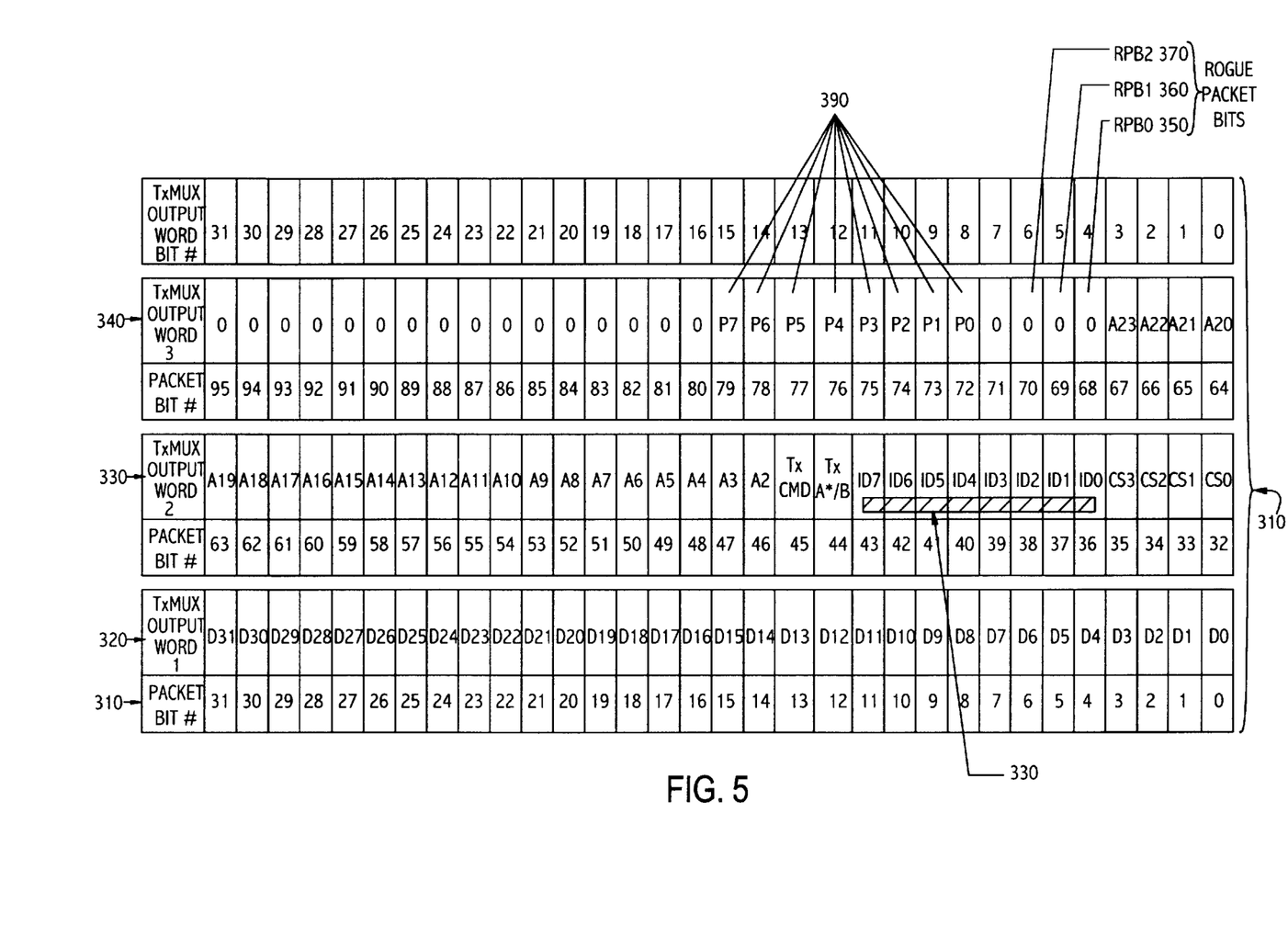
FIG. 5 is a memory map of a data packet illustrating the rogue packet bits.

FIG. 5 is a memory map of the Data Packet 310 representing the information written to the global RAM 130. The data packet 310 can be a 96-bit parallel triple word. The data packet can be comprised of three 32-bit words. Word 1 320 contains 32-bits of information representing the data written to the global RAM 130 by the host computer 140. Word 2 330 contains bits A2 through A19 of the address in memory of the data to be updated, as well as the originating node address 380. Word 3 340 contains the rest of the address bits, and the parity bit information for the entire data packet 310. Also in Word 3 340 are three rogue packet bits 350–370. It will be appreciated by those skilled in the art that the bits chosen as rogue packet bits 350–370 are bits which would otherwise be unused in the data packet.

In the data packet 310, certain bits which have no function may be either reserved or unused. Reserved bits are bits in the data packet which cannot be used due to the data transmission protocol. Unused bits, however, are bits which serve no current function, but merely exist because of the previously mentioned requirement that the data packet size can often only be increased in increments of 32 bits.

In the preferred embodiment, three rogue packet bits were selected, however it will be obvious to those skilled in the art that other numbers of rogue packet bits could be used. The number of rogue packet bits available is a function of the number of unused bits in the data packet.

FIG. 5 illustrates the construct of the data packet 310 that is created in the Tx MUX 220 by multiplexing the data input from the Tx FIFO 210 with the rogue packet bit information and parity information generated within the Tx MUX 220.

Figure 6:
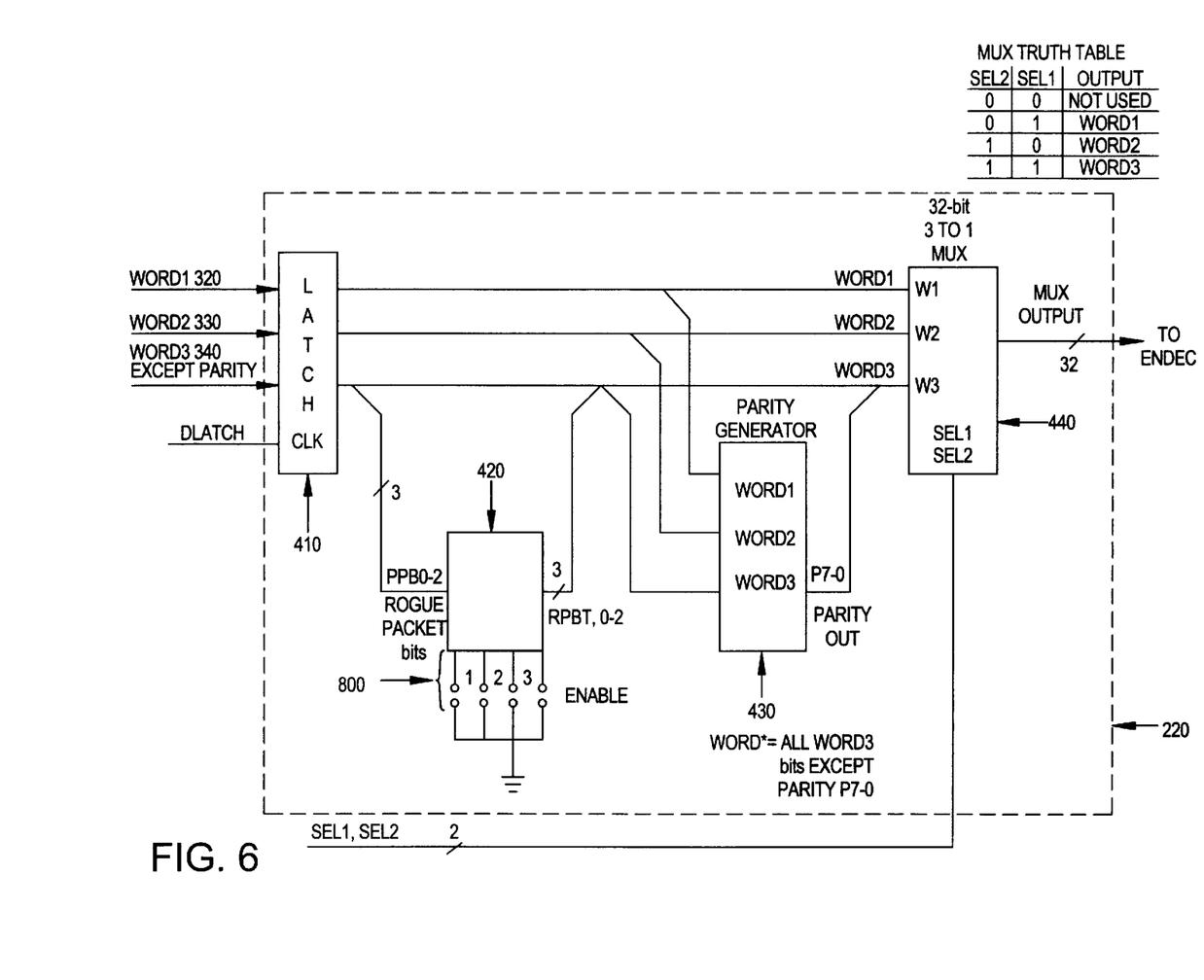
FIG. 6 is a functional block diagram of the Transmit Unit Multiplexer ("Tx MUX") including the rogue packet bit generator.

FIG. 6 is a functional block diagram of the Tx MUX 220. Upon command by the Tx State Machine 250, the data stored in the Tx FIFO 210 is output to the Tx MUX 220 and latched therein at latch 410. When the data has been latched in the Tx MUX 220, Word 1 320 and Word 2 330 are complete. However, Word 3 340 must be routed from the latch 410 through the Rogue Packet Bit Generator ("RPBG") 420 to the Parity Generator 430 in order to insert calculated parity.

If the node 180 has been selected as a rogue packet remover node ("RDP Remover"), then an appropriate jumper is set in the RPBG 420. If the jumper is set, the RPBG 420 will set the rogue packet bit 350–370 corresponding to its enabled jumper. For instance, if jumper one is enabled in the RPBG 420, then the node will set RPB0 350. If the node is not intended to be a rogue packet remover node, none of the jumpers in the RPBG 420 are enabled, and data packet transmission occurs normally.

Word 1 320, word 2 330, and word 3 340 are presented to the Tx Encoder/Decoder ("Tx ENDEC") 230 sequentially through a 32 bit wide 3 to 1 MUX 440 with word 1 first and word 3 last. The Tx ENDEC 230 receives the 32-bit longword information from the Tx MUX 220, performs an 8b/10b encoding of the data and outputs the encoded data in 10-bit parallel format data packets to the Tx Transmitter 240. The data packet 310 is now available to be output by the Tx Transmitter 240, along the serial data ring 150, to the next node 180.

Parity bits are generated while word one 320 and word two 330 are being presented to the Tx ENDEC 230. Simultaneously, the RPBG 420 sets its respective rogue packet bit. The parity bits, rogue packet bits (those not generated are passed through) and the address bits A20 through A23 are used to construct word 3 which is presented to the Tx ENDEC immediately following word 2.

FIG. 7A is a functional block diagram of the Receive Unit ("Rx Unit") 110. The node 180 receives a data packet 310 from the serial data ring 150 at the Rx Receiver 510. The Rx Receiver 510 transmits the received 10-bit parallel format data packets to the Rx Decoder 520. The Rx Decoder 520 re-formats the received data into 32-bit words for output to the Rx Register and Parity Checker ("Rx REG") 530. It is within the Rx REG 530 that the node 180 determines whether the data packet 310 is a rogue data packet. The functionality of the Rx REG 530 is discussed in detail below. The receiver unit may be selected as a rogue packet remover by jumpering the enable (EN) position jumper field 800. If the Rx REG 530 determines that the data packet is a rogue data packet, then that information is conveyed to the Rx State Machine 540 which then discards the data packet 310. If the Rx REG 530 determines that the data packet is not a rogue data packet and not bad parity and not originated at node 180, then the Rx State Machine 540 clocks the data packet 310 into the Rx FIFO 550. From the Rx FIFO 550, the data packet 310 will be simultaneously clocked into the global RAM 130 and the Tx Unit 120.

Before data is clocked from the Rx REG 530 into the Rx FIFO 550, the Node ID Comparator 560 compares the originating node address 380 stored within Word 2 330 of data packet 310 to the node's own unique network address. The Node ID Comparator 560 reads the Node ID Register 570 which is pre-programmed with the node's unique network address, or Node ID 580. The Node ID Register 570 can be set by an 8-bit jumper field. If the Node ID 580 stored in the Node ID Register 570 is the same as the originating node address 380 stored within the data packet 310, then the Rx State Machine 540 recognizes that the data packet was generated at this node 180 and, therefore, discards it by not clocking data packed 310 into Rx FIFO 510.

FIG. 7B illustrates in greater detail the elements of the invention as shown in FIG. 7A and as described above.

Figure 8:
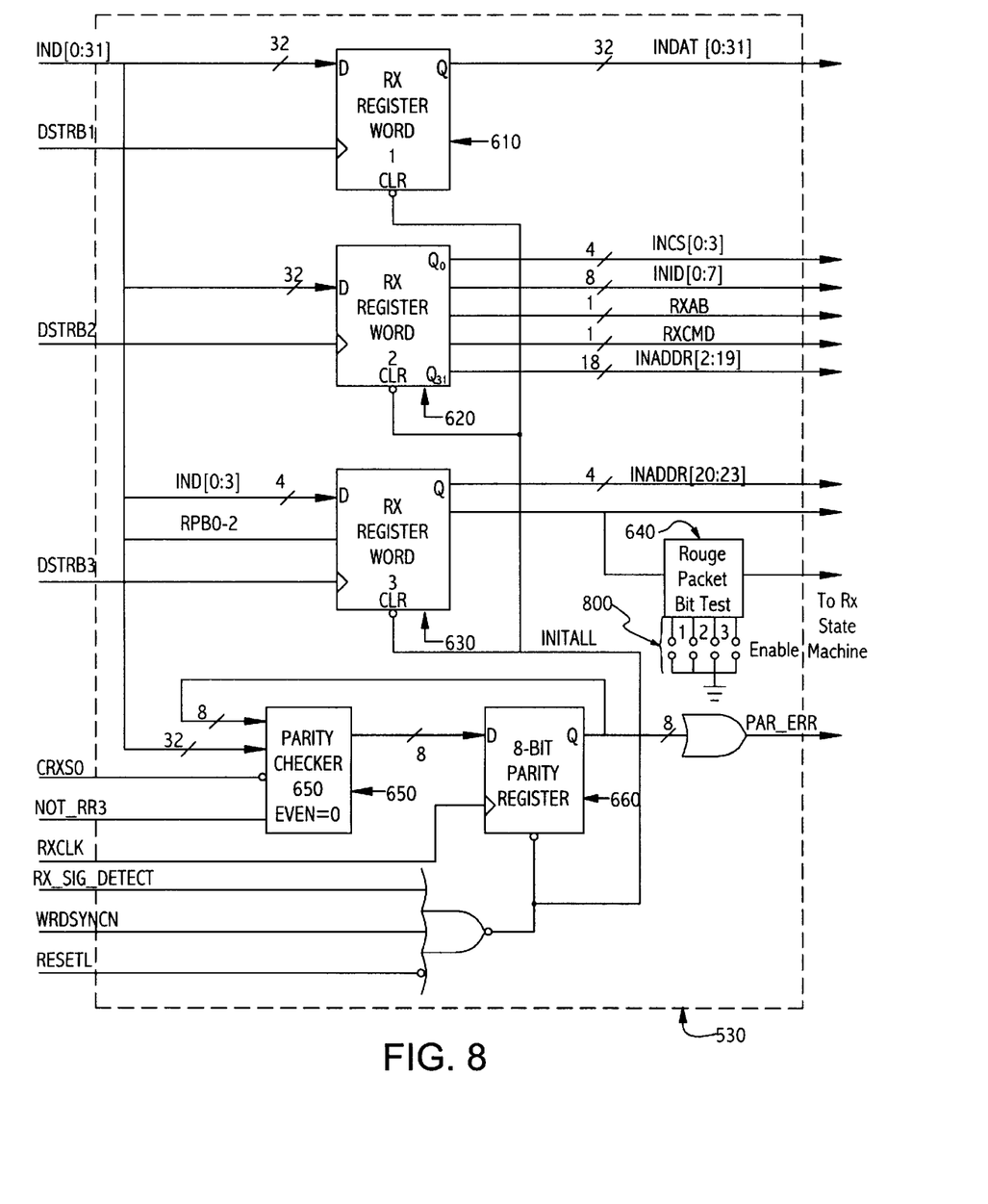
FIG. 8 is a functional block diagram of the Receive Register/Parity Checker ("Rx REG") illustrating the rogue packet bit tester.

FIG. 8 is a functional block diagram of the Receive Register/Parity Checker "Rx REG" 530. The Rx REG 530 receives a 32-bit wide serial data stream comprising the three received 32-bit data words from the Rx Decoder 520. The Rx REG 530 de-multiplexes the input from the Rx Decoder 520 into the three data packet 310 words. Word 1 320 is stored in Rx REG/Word 1 610. Word 2 330 is stored in Rx REG/Word 2 620, and Word 3 340 is stored in Rx REG/Word 3 630. The rogue packet bits 350–370 contained in Word 3 340 are routed from the Rx REG/Word 3 630 to the Rogue Packet Bit Tester 640.

The Rogue Packet Bit Tester 640 is jumpered to coincide with the RPBG 420 at the same node 180. Accordingly, if the rogue packet bit is set, then the RPBG 420 at that node set it, so the Rogue Packet Bit Tester 640 will trigger a rogue packet error in the Rx State Machine 540. The Rx State Machine 540 will recognize that the data packet 310 is a rogue packet, and discard it.

Figure 9:
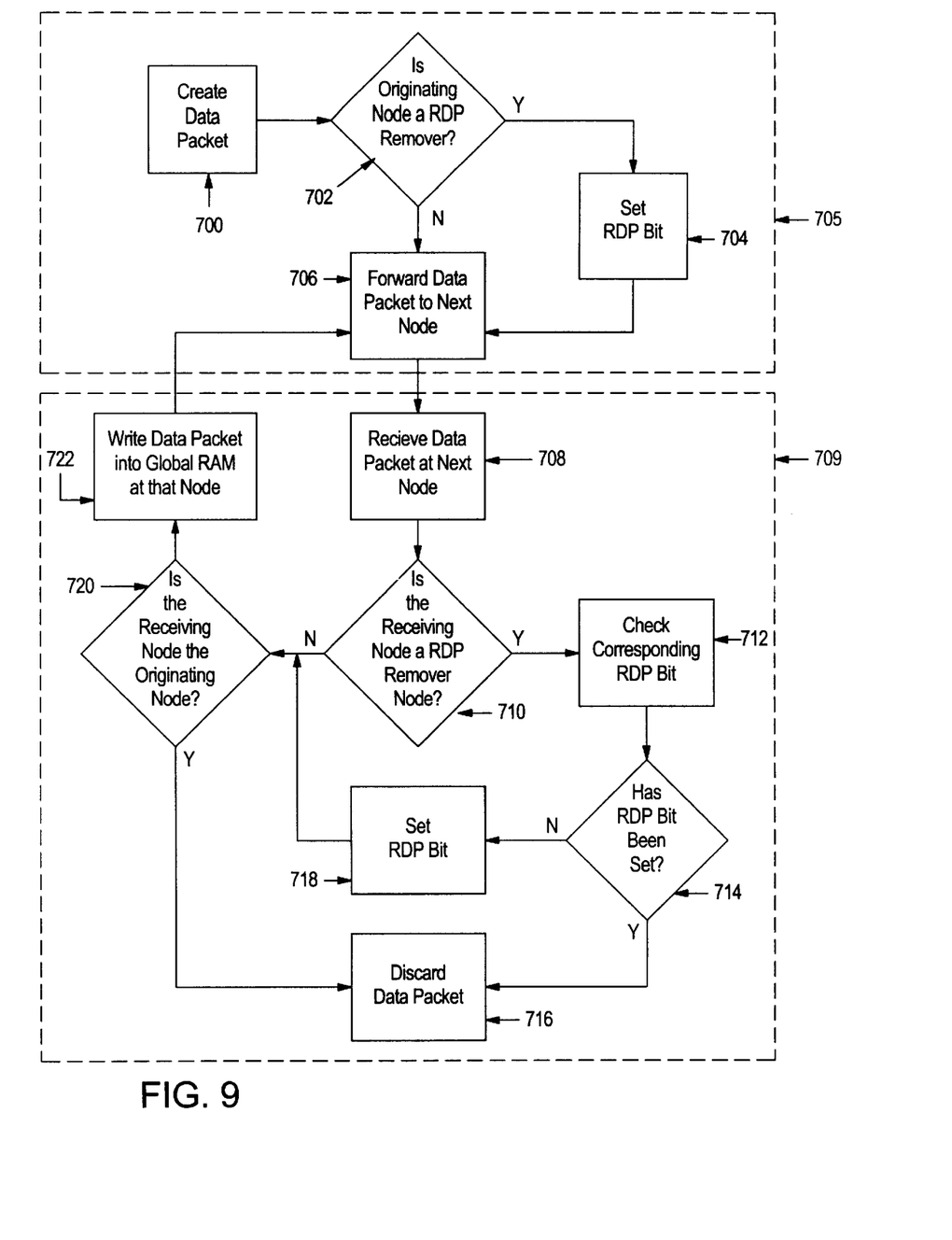
FIG. 9 is a flow chart showing the sequential operations for removing rogue data packets in accordance with the invention.

FIG. 9 illustrates the sequential operations for rogue data packet removal in accordance with the present invention. The method of the invention employs the use of data packet remover nodes which monitor the data packet s traveling around the data ring 150, and remove those that have traveled more than once around the data ring 150.

The sequential operations begin at initial block 700. The originating node 705 updates the information in its own global RAM 130 resident at that node 705. The originating node 705 then creates a data packet 310 containing the relevant information which will be broadcast to each of the other nodes 180 on the serial data ring 150. At decision block 702, the originating node 705 determines if it is a RDP Remover node by polling its RPBG 420. At block 706, if the originating node 705 is not a RDP Remover node, then the data packet 310 is forwarded to the next node 180 on the serial data ring 150. At block 704, if the originating node 705 is a RDP Remover node, then it sets its respective rogue packet bit 350–370 within Word 3 340, and forwards the data packet 310 to the next node 180.

At block 708, the receiving node 709 receives the data packet 310. At decision block 710, once it receives the data packet 310, the receiving node 709 determines if it is a RDP Remover node by polling its RPBG 420. If the receiving node 709 is a RDP Remover node, then, at block 712, it checks its corresponding rogue packet bit 350–370 within Word 3 340 of the data packet 310. At decision block 714, if the corresponding rogue packet bit 350–370 has been set, then the receiving node 709 discards the data packet 310 at block 716. If the rogue packet bit 350–370 has not already been set, then at block 718 the receiving node 709 sets its corresponding rogue packet bit 350–370.

Once the rogue packet bit 350–370 has been set, or if at decision block 710 the receiving node 709 is not a RDP Remover node, then the sequence proceeds to decision block 720. At decision block 720, the receiving node 709 tests to determine if it is the originating node 705 of the data packet 310 by comparing the receiving node's Node ID 580 with the originating node address 380 stored within the data packet 310. If the originating node address 380 is the same as the Node ID 580 of the receiving node 709, then the receiving node 709 discards the data packet 310 at block 716.

If the receiving node 709 is not the originating node 705, then, at block 722, the receiving node 709 writes the information from the data packet 310 into the global RAM 130 at that node 709. Finally, the receiving node 709 forwards the data packet 310 to the next node 180 on the serial data ring 150 and the process continues until either a match is found between the originating node address 380 and a node's Node ID 580, or a RDP Remover node removes the data packet 310.

Thus, data packets which have become rogue through some failure by the originating node to remove the data packet can still be removed and prevented from causing damage to valid memory on the reflective memory network.

ENHANCEMENTS TO THE PREFERRED EMBODIMENT

The preferred embodiment as described thus far requires that the host processor 140 read from and/or write to the global memory. A Direct Memory Access (DMA) device could be added allowing data to be moved between global memory and the Host Computer's local memory without the involvement of the Host Computer.

Figure 10:
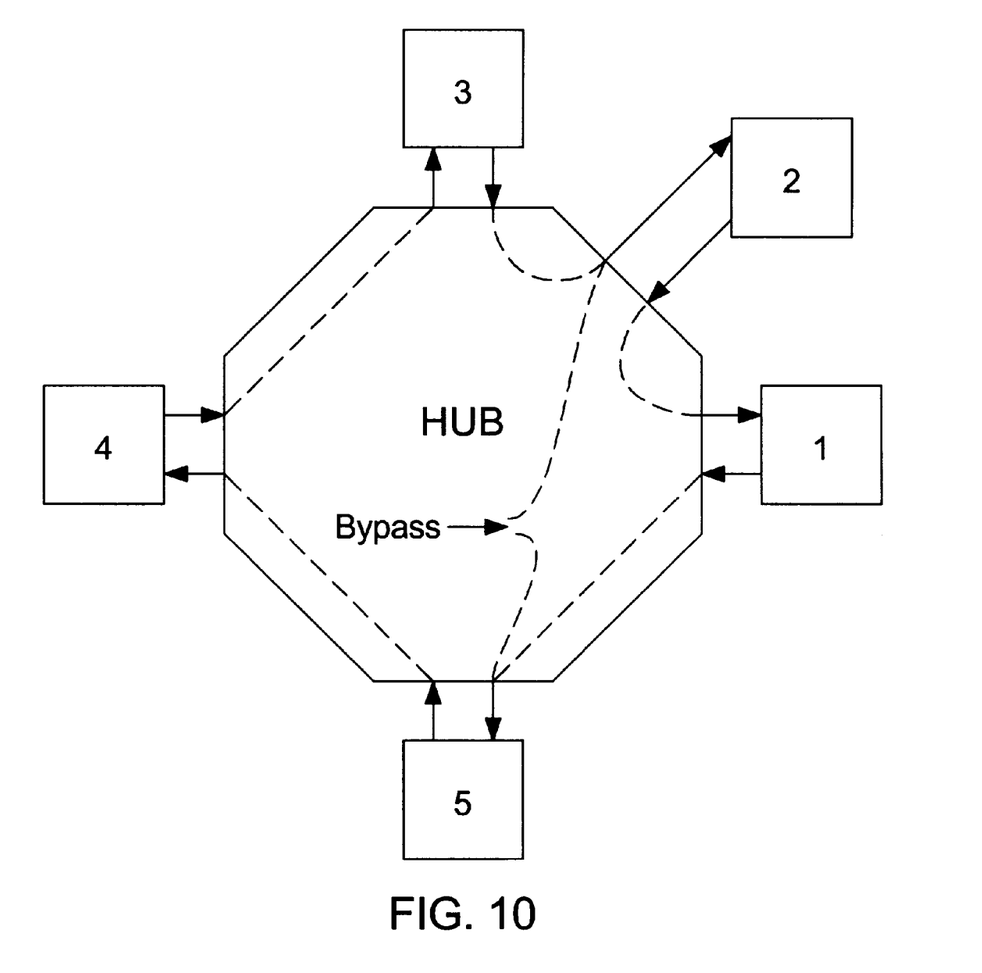
FIG. 10 is a logical ring topology network using a HUB.

Thus far a ring topology has been discussed relative to the subject matter of this invention. Clearly the invention does employ a ring topology in the sense that a data path exists that travels from node to node, passing through each node once and returning to the originating node. It is not necessary that the embodiment be a physical ring and may, for example, employ a Hub as shown in FIG. 10. In a single Hub embodiment, the data passes through the Hub each time that the data is passed from a node, and each node receives data from the Hub, rather than directly from another node. The Hub may include data routing circuitry that allows nodes to be bypassed.

Figure 11:
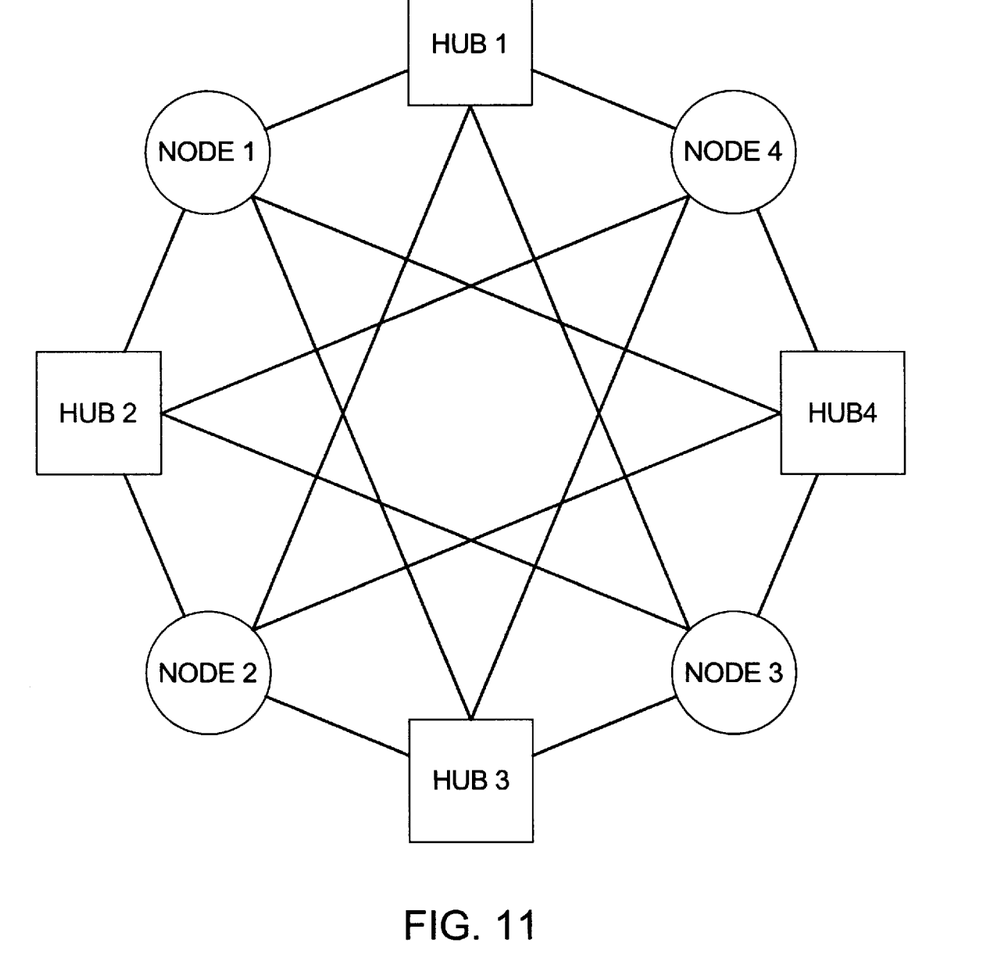
FIG. 11 shows a logical ring topology network using multiple nodes, multiple HUBs, and providing quad-redundancy.

In an additional embodiment, a multiple node system may employ a multiple number of Hubs. Such a system allows for data path redundancy. Each node would be capable of sending data to, and receiving data from, each Hub. The present invention, when employed in a multi-node, multi-Hub system, will operate to remove rogue data packets in the same manner as described earlier. FIG. 11 provides a logical diagram of a multinode/multiHub system with quad-redundancy.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention. While the invention has been described with reference to details of the illustrated embodiments, these details are not intended to limit the scope of the present invention as particularly pointed out and distinctly claimed below.

What is claimed is:

1. In a data processing system containing a plurality of data processing nodes in which data are passed from node to node, a method of removing certain passed data from circulation, said method comprising:
    a. designating one node as a data removal node,
    b. discerning when the certain passed data initially arrives at the data removing node,
    c. causing the certain passed data to be marked to indicate that it has initially arrived at the data removal node,
    d. continuing to pass the certain passed data from node to node, and
    e. removing the certain passed data from circulation when it arrives at the data removal node the second time.

2. The method of claim 1 wherein the method of passing data from node to node is unidirectional.

3. The method of claim 2 wherein the unidirectional passing is also serial.

4. The method of claim 1 wherein the method of passing data from node to node includes the use of a data bus.

5. The method of claim 4 wherein the data bus is a fiber optic medium.

6. The method of claim 1 wherein the medium used in passing data from node to node is a data bus.

7. The method of claim 1 wherein the data exist in the form of data packets.

8. The method of claim 7 wherein the marking of the certain passed data consists of the addition of data to its data packet.

9. The method of claim 8 wherein the data removal node senses said addition to data packet and in response thereto removes said passed data packet.

10. The method of claim 1 wherein each datum of said data is originated by a data originating node.

11. The method of claim 10 wherein the data removal node is not the data originating node.

12. The method of claim 1 wherein the means for passing data includes one or more Hubs.

13. A method of removing passed data packets from a data network containing a plurality of nodes, said method comprising:
    a. at least one node capable of originating a data packet for transmission to each of the plurality of nodes,
    b. said data packet containing at least one data bit dedicated to marking said packet for removal from the network,
    c. at least one node configured as a data packet removal node,
    d. said data originating node capable of originating said dedicated data bit in a state indicating that said data packet has not passed through said data packet removal node,
    e. said data packet removal node capable of changing the state of the dedicated data bit upon the first pass of the data packet through the data packet removal node,
    f. said data packet removal node capable of testing said dedicated bit and for removing said packet if said bit is set to a state indicating that it had already passed through the data packet removal node once.

14. The method of claim 13 wherein the method of transmitting data from node to node is unidirectional.

15. The method of claim 14 wherein the data are transmitted serially.

16. The method of claim 13 wherein the method of transmitting data from node to node is a data bus.

17. The method of claim 16 wherein the data bus is a fiber optic medium.

18. The method of claim 13 wherein the medium used in transmitting data from node to node is a data bus.

19. The method of claim 13 wherein the data removal node is not the data originating node.

20. The method of claim 13 wherein the means for transmitting data includes one or more Hubs.

21. In a data processing system containing a plurality of data processing nodes in which data are passed from node to node sequentially, a method of removing certain passed data from circulation, said method comprising:
    a. designating one node as a data removal node,
    b. discerning when the certain passed data initially arrives at the data removing node,
    c. causing the certain passed data to be marked to indicate that it has initially arrived at the data removal node,
    d. continuing to pass the certain passed data from node to node,
    e. removing the certain passed data from circulation when it arrives at the data removal node the second time.

22. The method of claim 21 wherein the method of passing data from node to node is unidirectional.

23. The method of claim 21 wherein the method of passing date from node to node includes the use of a data bus.

24. The method of claim 21 wherein the medium used in passing data from node to node is a data bus.

25. The method of claim 21 wherein the data exist in the form of data packets.

26. The method of claim 25 wherein the marking of the certain passed data consists of the addition of data to its data packet.

27. The method of claim 21 wherein each datum of said data is originated by a data originating node.

28. The method of claim 27 wherein the data removal node is not the data originating node.

29. The method of claim 21 wherein the means for passing data includes one or more Hubs.

* * * * *